April 29, 1969 J. HEKRDLE 3,441,835
STEP-BY-STEP NONLINEAR VOLTAGE DIVIDER FOR DIGITAL PHOTOMETER
Filed Jan. 21, 1965

INVENTOR.
Jan Hekrdle

INVENTOR.
Jan Hekrdle

3,441,835
STEP-BY-STEP NONLINEAR VOLTAGE DIVIDER
FOR DIGITAL PHOTOMETER
Jan Hekrdle, Roztoky, Czechoslovakia, assignor to
Ceskoslovenska akademie Ved, Prague, Czechoslovakia
Filed Jan. 21, 1965, Ser. No. 426,811
Claims priority, application Czechoslovakia,
Jan. 28, 1964, 494/64
Int. Cl. G01r 23/00; G01j 5/08, 5/20
U.S. Cl. 323—80                                       2 Claims

ABSTRACT OF THE DISCLOSURE

A step-by-step nonlinear voltage divider for a digital photometer has individual steps of different values which may be further subdivided. Each step comprises a pair of resistors connected in parallel. The resistance value of one of the resistors is the same in all the steps. An additional voltage divider has an overall resistance value which is equal to the value of the one of the resistors. A switching arrangement is connected between the resistors and the additional voltage divider for disconnecting a selected one of the one of the resistors from the corresponding other of the resistors and connecting the additional voltage divider.

---

The invention relates to a digital photometer, for example for film dosimetry, using two photoelectric cells.

Photometrical methods are now used in many industrial branches for checking and controlling production, development work and research.

Photometers have lately also been used in nuclear physics for measuring ionization radiation by the method of photographic emulsion. This method has also been sufficiently worked out and has been largely used in checking the safety of work for personal control of the employees. Blackening of the control films is a measure for ascertaining the radiation doses which the individual employees have received. The magnitude of the blackening is defined as the logarithm to the base 10 of the ratio between the intensity of the light incident on the film and the intensity of the light which has passed through the film. One measures integral blackening on the film surface. The dispersed light of a standard incandescent lamp is used for illumination. Hence $$S = \log_{10} \frac{I_o}{I}$$

where S is the blackening, $I_o$ is the intensity of the incident light, I is the intensity of the light which has passed through the film.

Sometimes the total film blackening is measured, and sometimes one subtracts the fundamental blackening of the non-illuminated developed emulsion including the base. Then, if $S_d$ is the blackening due to ionization radiation, $S_z$ is the blackening of the non-illuminated film and $I_z$ is the intensity of the light which has passed through the non-illustrated film, one obtains $$S = \log \frac{I_o}{I_z} \cdot \frac{I_z}{I} = \log \frac{I_o}{I_z} + \log \frac{I_z}{I} = Sz + Sd$$

Thus, the value of the blackening $S_d$ caused by radiation only is ascertained by merely subtracting the fundamental blackening $S_z$ from the total blackening S.

In addition to the method of direct visual comparison which is infrequently used, methods which primarily utilize equipment with photoelectric elements are now frequently utilized. The photoelectric elements are of the semiconductor type, or photoelectric cells of the vacuum type or of the gas filled type. The current flowing through the photoelectric cell is determined by the principle that the current is linearly proportional to the intensity of illumination, $$i_f = k.I$$

where $I_f$ is the current flowing through the photoelectric cell, k is the constant, I is the intensity of illumination.

Several types of photometers have been designed using this principle and intended for various purposes, such as for spectral analysis, for which perfect types of photometers have been constructed. But because of their special application, these instruments are not suitable for measuring dosimetrical films. They usually measure in a very small area or slot, and the method of reading tires the eyes in mass measurements and automatic equipment. The registration of the measurement for purposes of checking and statistics is thus difficult.

Existing photometers use either a single photoelectric cell, or two photoelectric cells. Photometers of the first type are sensitive to variations in the supply voltage, more particularly to variations in the voltage of the illumination source. This is a drawback when carrying out measurements extending over a longer period of time.

Photometers of the second type, that is those using two photoelectric cells and the bridge principle, are mechanically very complicated and expensive. Reading is accomplished on a sensitive mirror galvanometer and is very tiresome to the eye, particularly if many measurements have to be carried out. In other types, the light fluxes are balanced to zero of the galvanometer by means of mechanical shutters or diaphragms or a tone wedge. The construction of such a device is costly and the measurement tedious, and this is again a drawback if many measurements have to be carried out.

It is a general object of the invention to eliminate the aforementioned drawbacks. The photometer in accordance with the invention uses two photoelectric cells. It is therefore independent of variations in the voltage of the illumination lamp. One of the photoelectric cells operates as a reference element. Its current is amplified by a D.C. tube amplifier with 100% feedback. Part of the output voltage is used for compensation of the second photoelectric cell which operates as a measuring element.

The fundamental feature of the invention resides in the construction of an output voltage divider of the amplifier for obtaining the compensation voltage for the second photoelectric cell. This output voltage divider comprises two potentiometers. The first of the said potentiometers is connected across the entire output voltage of the amplifier of the first photoelectric cell. The second potentiometer is connected between the slide contact and the zero end of the first potentiometer. The second potentiometer serves for obtaining the voltage for compensation of the current of the second photoelectric cell. Its position directly indicates the values S. The second potentiometer is of the step-by-step type, but because it has a linear characteristic, a special circuit arrangement is used which is also part of the invention. Each section of the step-by-step potentiometer comprises two parallel resistors. One of these resistors has a constant value for all sections; the second resistor adjusts the total resistance of the sections to the proper value. The first (constant) resistors are alternately disconnected and another voltage divider is connected instead of them. The voltage divider comprises ten resistors each of which has a value equal to one tenth part of the value of the disconnected resistor. Therefore, the change does not affect the total value of the given section. In this manner, even with a nonlinear course, steps are provided in two rows (in the case considered, tenth parts and hundredth parts of S). The error produced by the fact that the various steps of the nonlinear course or behaviour are further divided into a linear ratio, is small and negligible.

The invention will be best understood from the following specification to be read in conjunction with the accompanying drawings, in which:

FIG. 1 explains the fundamental principle of the invention;

Figure 1:
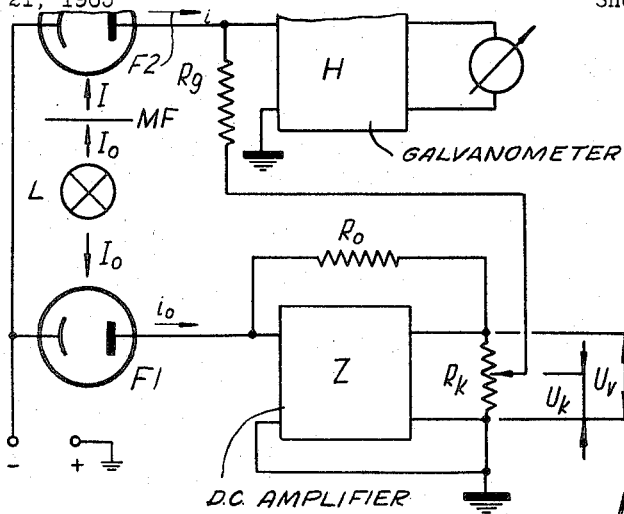

Referring now more particularly to FIG. 1, it should be understood that the light of the lamp L falls upon the photoelectric cell F1 and through the measured film MF upon the photoelectric cell F2. In accordance with the Stolet law the current flowing through the photoelectric cells is proportional to the intensity of the incident light, that is $$i \approx I, \; i_o \approx I_o \qquad (1)$$

The current of the comparison photoelectric cell is amplified by the DC tube amplifier Z. By means of the resistor $R_o$ 100% negative feedback is introduced into this amplifier so that the voltage amplification $A_n$ of the amplifier is approximately 1, and the error is of the order 0.1%. By means of the resistive voltage divider a portion $U_k$ is taken of the output voltage $U_v$ to compensate the current $i$ flowing through the photoelectric cell F2 so that the voltage across the input of the galvanometer H is zero. The output voltage $U_v$ of the amplifier Z is $$U_v = I_o R_o, \text{ that } i_o = \frac{U_v}{R_o} \qquad (2)$$

The necessary compensation voltage is $$U_k = i R_g, \text{ that is } i = \frac{U_k}{R_g} \qquad (3)$$

Blackening of the film is then given by the relation $$S = \log \frac{I_o}{I} = \log \frac{i_o}{i} = \log \frac{U_v}{R_o} \cdot \frac{R_g}{U_k} = \log \frac{R_g}{R_o} + \log \frac{U_v}{U_k} \qquad (4)$$

If the logarithms are to the base 10 in Equation 4, the characteristic S is provided.

Figure 2:
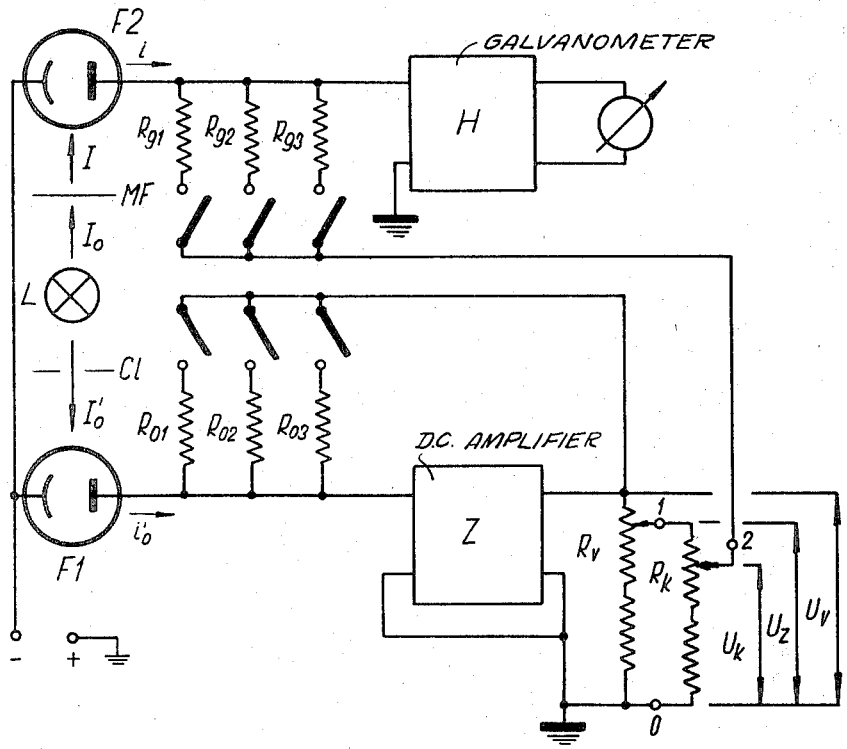
FIG. 2 illustrates an actual embodiment of the invention.

In the actual embodiment illustrated in FIG. 2, conditions are somewhat more complicated. For structural reasons it cannot be reliably guaranteed that the intensity of the light $I_o$ incident on the film is the same as the intensity of the light incident on the comparison photoelectric cell. In the mentioned case, the device is so arranged that more light $I_o$ falls on the photoelectric cell than on the film. This intensity can be roughly adjusted by a mechanical diaphragm Cl. The intensity of $I_o'$ is then greater than that of $I_o$, and therefore $$i_o = k \cdot i_o'; \; k < 1 \qquad (5)$$

The resistors $R_o$ for the feedback and the resistors $R_g$ in the circuit of the measuring photoelectric cell can be swiched over and they are in the ratio 1:1, 10:1, 1000:1. The output voltage $U_v$ of the DC tube amplifier Z is reduced by the voltage divider $R_v$ to a value $U_z$ and this voltage is used by the calibrated voltage divider $R_k$ for obtaining the compensation voltage $U_k$.

Equation 4 becomes $$S = \log \frac{I_o}{I} = \frac{i_o}{i} = \log \frac{k \cdot i_o'}{i} = \log \frac{k \cdot U_v}{R_{on}} \cdot \frac{R_{gn}}{U_k} = \log k \frac{U_v}{U_z} + \log \frac{R_{gn}}{R_{on}} + \log \frac{U_z}{U_k}; (n=1,1,3) \qquad (6)$$

which is similar to Equation 4 except for the first member term thereof. The first term equals zero if, in the first measuring range, that is $R_{g1} = R_{o1}$ and $U_z = U_k$, the slide contact being in the upper position, the galvanometer H is adjusted to zero by the voltage divider $R_v$ without the inserted film ($S = O$), or with the inserted "zero" film ($S = S_z$). Then $U_z/U_v = k$ and $\log k \cdot U_v/U_z = 0$. Therefore, the voltage divider $R_v$ serves for adjusting the fundamental zero position, either without the inserted film, or with the inserted "zero" film for measuring the blackening only under the effect of radiation. The voltage divider $R_k$ is of the step-by-step type, controlled by a relay connected in parallel with the output of the galvanometer H. Its contacts control the relay hunting system which automatically adjusts the necessary range, which already indicates the characteristic S, as well as the compensation voltage $U_k$. The position of the step-by-step voltage divider, in this case one with two decades, indicates tenths and hundredths of S.

Figure 3:
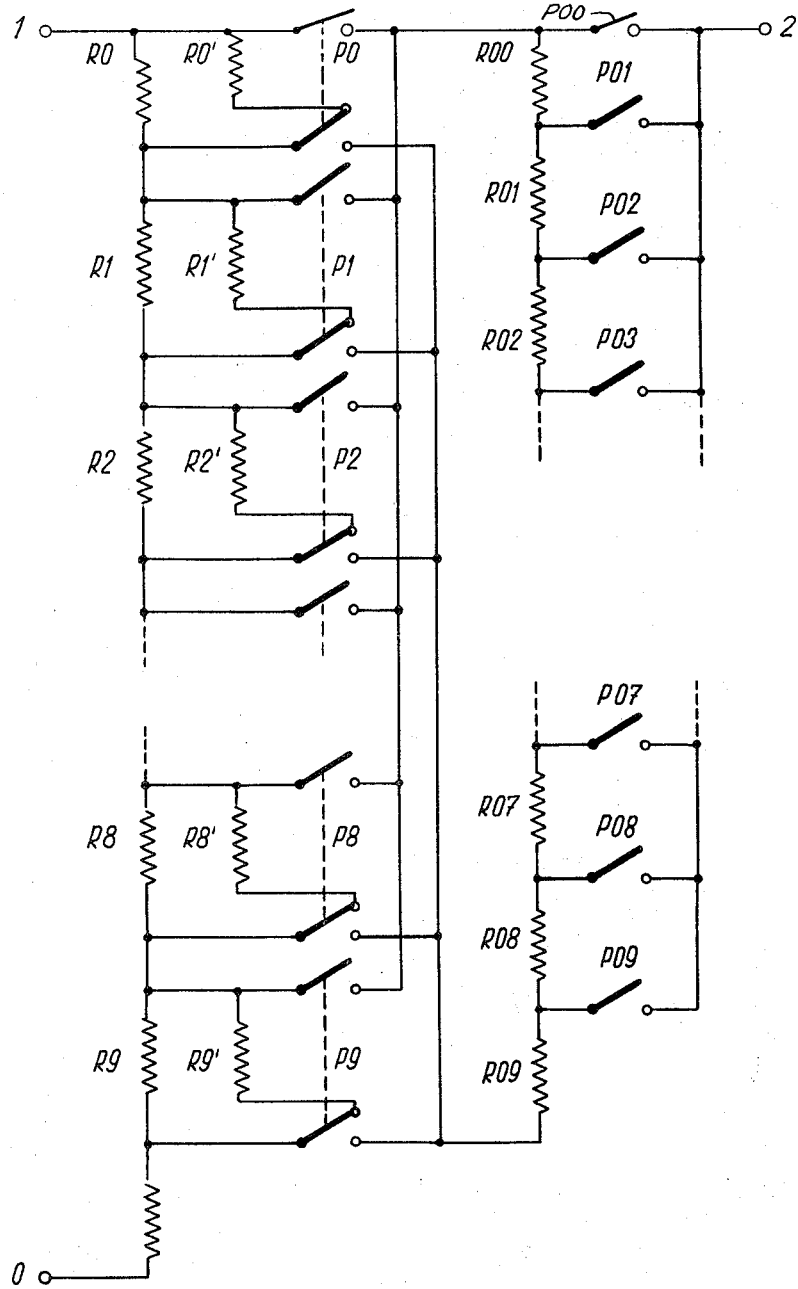
FIG. 3 shows a further detail of the invention.

FIG. 3 shows the connection of the voltage divider $R_k$. The points of connection 0, 1 and 2 correspond to equally marked points in the diagram in FIG. 2. Since the characteristic of the resistor is a linear one, the usual circuit arrangement cannot be used. For the first decade, the resistance of each section consists of two parallel resistors R0 and R0', R1, and R1', R2, and R2' and the like. All the resistors R0' to R9' have the same value, and their lower ends are connected through the rest contacts of the relays P0 to P9 with the resistors R0 to R9. By alternate closing of the individual relays P0 to P9, the resistors R0' to R9' are alternately disconnected, and the resistors R0 to R9 are connected instead with the voltage divider of the second decade which consists of resistors R00 to R09. The total resistance of this second voltage divider equals one of the resistors R0' to R9' so that the resistance of the various sections of the first decade and the total resistance and characteristic do not change. The relay contacts P00 to P09 successively change over the slide contact of the potentiometer and divide the various sections of the first decade into an additional ten parts.

In accordance with Equation 4, the number of the range (1, 2, 3) forms the characterisic of the blackening S, the position of the first decade the first decimal place and the position of the second decade the second decimal place of S. The relays for changing over the ranges and the ranges and the various decades of the voltage divider $R_k$ also switch over lamps which indicate the blackening directly in numerals. The result of the measurement obtained by this method can be readily registered automatically on an electrical adding machine, or perforated into a punched card for statistical purposes.

The advantages of the digital photometer of the present invention are obvious. Low installation costs, absolute measuring method and possibility of full automation are advantages. The measurement is independent of the fatigue of the eyes of the operator. The results are expressed by definite means, that is, by numerals. The device makes it possible to register the results automatically by printing or by means of punched cards of computing machines for purposes of registration and statistics.

What I claim is:
1. A step-by-step nonlinear voltage divider comprising
   a plurality of sections at least some of which have different resistance values from each other, each of said sections comprising a first resistor and a second resistor connected in parallel, the first resistor of each of said sections having the same resistance value;
   an additional voltage divider having an overall resistance value which is equal to the resistance value of said first resistor; and
   switching means connected between the first and second resistors and the additional voltage divider for disconnecting a selected one of the first resistors of said sections from the corresponding one of said second resistors and connecting said additional voltage divider.

2. A step-by-step nonlinear voltage divider as claimed in claim 1, wherein said switching means comprises relay changeover contacts.

(References on following page)

References Cited

UNITED STATES PATENTS

| | | |
|---|---|---|
| 3,064,182 | 11/1962 | Chilton _____ 323—80 X |
| 3,403,324 | 9/1968 | Bradley _____ 323—80 |
| 2,237,950 | 4/1941 | Pineo. |
| 2,839,740 | 6/1958 | Haanstra. |
| 2,939,361 | 6/1960 | Hock. |
| 3,016,787 | 1/1962 | Brehm. |
| 3,080,790 | 3/1963 | Morgan. |
| 3,220,304 | 11/1965 | Clapp. |
| 3,340,764 | 9/1967 | Bergson. |

OTHER REFERENCES

Dean et al., "A Digital Potentiometer," Electronic Engineering, February 1956, vol. 28, No. 336, pp. 66–69.

JOHN F. COUCH, *Primary Examiner*.

G. GOLDBERG, *Assistant Examiner*.

U.S. Cl. X.R.

88—23; 323—94